United States Patent
Kang (10) Patent No.: US 10,916,144 B2
(45) Date of Patent: Feb. 9, 2021

(54) ANTI-COLLISION CONTROL DEVICE AND METHOD THEREFOR

(71) Applicant: MANDO CORPORATION, Pyeongtaek-si (KR)

(72) Inventor: Tae Seok Kang, Suwon-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 168 days.

(21) Appl. No.: 16/135,692

(22) Filed: Sep. 19, 2018

(65) Prior Publication Data

US 2019/0088138 A1     Mar. 21, 2019

(30) Foreign Application Priority Data

Sep. 21, 2017   (KR) ........................ 10-2017-0121596

(51) Int. Cl.
| | | |
|---|---|---|
| *G08G 1/16* | (2006.01) | |
| *B60W 40/04* | (2006.01) | |
| *B60W 30/095* | (2012.01) | |
| *B60W 50/16* | (2020.01) | |

(52) U.S. Cl.
CPC ......... *G08G 1/167* (2013.01); *B60W 30/0953* (2013.01); *B60W 40/04* (2013.01); *G08G 1/166* (2013.01); *B60W 50/16* (2013.01); *B60W 2420/42* (2013.01); *B60W 2554/801* (2020.02)

(58) Field of Classification Search
CPC ... G08G 1/167; G08G 1/166; B60W 30/0953; B60W 40/04; B60W 2554/801; B60W 50/16; B60W 2420/42
See application file for complete search history.

(56) References Cited

U.S. PATENT DOCUMENTS

| | | | | |
|---|---|---|---|---|
| 9,487,212 | B1 * | 11/2016 | Adam | B60W 30/143 |
| 2011/0215947 | A1 * | 9/2011 | Ekmark | G08G 1/163 |
| | | | | 340/902 |
| 2012/0130561 | A1 * | 5/2012 | Chiang | B60W 30/12 |
| | | | | 701/1 |
| 2015/0145694 | A1 * | 5/2015 | Dupont | B60Q 9/008 |
| | | | | 340/903 |
| 2018/0339708 | A1 * | 11/2018 | Geller | B60W 50/0097 |
| 2020/0051435 | A1 * | 2/2020 | Hashimoto | B60R 1/00 |

FOREIGN PATENT DOCUMENTS

| | | |
|---|---|---|
| JP | 2009-161139 A | 7/2009 |
| JP | 2009-211309 A | 9/2009 |
| JP | 2012-221116 A | 11/2012 |
| KR | 10-2012-0045596 A | 5/2012 |

OTHER PUBLICATIONS

Korean Office Action dated Jan. 22, 2019 issued in Korean Patent Application No. 10-2017-0121596.

* cited by examiner

*Primary Examiner* — Aaron L Troost
(74) *Attorney, Agent, or Firm* — Morgan, Lewis & Bockius LLP (57) ABSTRACT

Provided is an anti-collision control device of a vehicle, and a method therefore. Particularly, provided is a method and apparatus for avoiding a collision by previously sensing a risk of collision with a neighboring vehicle when a vehicle is located in a blind spot of the neighboring vehicle.

14 Claims, 8 Drawing Sheets

ANTI-COLLISION CONTROL DEVICE AND METHOD THEREFOR

CROSS REFERENCE TO RELATED APPLICATION

This application claims priority from Korean Patent Application No. 10-2017-0121596, filed on Sep. 21, 2017, which is hereby incorporated by reference for all purposes as if fully set forth herein.

BACKGROUND OF THE INVENTION

1. Field of the Invention

The present disclosure relates to an anti-collision control device of a vehicle, and a method therefore. Particularly, the present disclosure relates to a method and apparatus for avoiding a collision by sensing a risk of collision with a neighboring vehicle in advance when a vehicle is located in a blind spot of the neighboring vehicle.

2. Description of the Prior Art

Recently, there has been increasing research on technologies for minimizing steering control and speed control by drivers so as to maximize the convenience of the drivers. Also, there has been research on technologies for providing various safety functions, such as a device to keep a vehicle in its lane, an emergency braking device, or the like for securing safety of a driver.

Particularly, there has been increasing vehicle collision risk attributable to blind spots which may be generated by the shape of a vehicle, the view angle of a driver, or the like, and there is a desire for various technologies for avoiding a decrease in safety.

For example, research is being conducted on a technology for a blind spot detector to provide a warning to a driver when a neighboring vehicle or an obstacle exists in a predetermined blind spot in the case in which a vehicle senses the corresponding blind spot using a radar sensor or the like and the driver intends to change lanes.

The blind spot detector senses the blind spot of a user vehicle using a radar sensor, and decreases the risk of collision with a neighboring vehicle when a driver changes lanes in the direction of the blind spot. Therefore, the blind spot detector may not secure safety when the neighboring vehicle drives in the direction of the user vehicle, which is a drawback. That is, in the case in which the user vehicle is located in the blind spot of the neighboring vehicle, the safety of the user vehicle may not be secured as the neighboring vehicle moves.

In order to secure the safety of a driver, it is important to prevent dangerous movement of the user vehicle, and it is also important to sense the dangerous movement of a neighboring vehicle in advance, so as to make a defensive movement.

Therefore, there is a desire for a technology for avoiding a collision by identifying risk, in advance, which may occur when the user vehicle is located in the blind spot of a neighboring vehicle.

SUMMARY OF THE INVENTION

With this background, an aspect of the present disclosure is to provide a method and apparatus for monitoring a separation distance between a user vehicle and a neighboring vehicle when the neighboring vehicle is located in a predetermined area, so as to sense a risk of collision with the neighboring vehicle in advance and to give a warning, whereby the safety of a driver may be increased.

Another aspect of the present disclosure is to provide a specific anti-collision control device and a method therefor, which may secure the safety of a user vehicle using a control device of the user vehicle although a blind spot detector is not installed in a neighboring vehicle, and may perform an operation for avoiding a collision.

In accordance with an aspect of the present disclosure, there is provided an anti-collision control device, the device including: a separation distance calculator configured to calculate a horizontal separation distance between a vehicle and a neighboring vehicle which drives in a lane next to a lane in which the vehicle drives; a neighboring vehicle's lane change intention detector configured to detect an intention to change lanes of the neighboring vehicle, based on the separation distance information; a collision risk calculator configured to calculate a risk of collision of the vehicle based on at least one from among information associated with the intention to change lanes of the neighboring vehicle, location information of the neighboring vehicle, location information of the vehicle, and relative speed information of the vehicle and the neighboring vehicle; and a signal output unit configured to output a movement control signal or a warning control signal for the vehicle based on a result from the calculation of the risk of collision of the vehicle.

In accordance with another aspect of the present disclosure, there is provided an anti-collision control method, the method including: a separation distance calculation operation for calculating a horizontal separation distance between a vehicle and a neighboring vehicle that drives in a lane next to a lane in which the vehicle drives; a neighboring vehicle's lane change intention detection operation for detecting an intention to change lanes of the neighboring vehicle using the separation distance information; a collision risk calculation operation for calculating a risk of collision of the vehicle based on at least one piece of information from among lane change intention information of the neighboring vehicle, location information of the neighboring vehicle, location information of the vehicle, and relative speed information of the vehicle and the neighboring vehicle; and a signal output operation for outputting a movement control signal or a warning control signal for the vehicle based on a result of calculating the risk of collision of the vehicle.

According to an embodiment, a separation distance between a user vehicle and a neighboring vehicle is monitored when the neighboring vehicle is located in a predetermined area, so that a risk of collision with the neighboring vehicle is sensed in advance and a warning is given, whereby the safety of a driver may be increased.

According to an embodiment, the safety of a user vehicle may be secured using a control device of the user vehicle although a blind spot detector is not installed in a neighboring vehicle, and vehicle movement control for avoiding a collision may be performed although a driver does not perform vehicle movement control.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

The present disclosure discloses an anti-collision control device and method therefor.

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

In the present specification, an anti-collision control device is a control unit configured to sense a risk of collision of a vehicle, and to output a signal for controlling the movement of the vehicle. For example, the anti-collision control device may indicate a Main Control Unit (MCU) or a CPU of the vehicle, or may indicate some functions of the MCU or the CPU. The functions performed by the anti-collision control device may include vehicle steering control, vehicle speed control, sensor control, collision risk calculation, and the like. The anti-collision control device may calculate a risk of collision between a vehicle and a neighboring vehicle, and may generate a signal for controlling the movement of the vehicle based on the risk of collision.

Also, the anti-collision control device may obtain various pieces of sensing information from sensors included inside or outside the vehicle, and may calculate a risk of collision, a collision-free path, and the like for the vehicle using the obtained sensing information. Also, the anti-collision control device may generate a control signal for controlling an operation of each sensor, and may transmit the same to a corresponding sensor.

A vehicle may include various sensors, such as an ultrasonic sensor, a radar sensor, a lidar sensor, a camera sensor, a torque sensor, a steering angle sensor, a vehicle speed sensor, and the like. In the present specification, the type of sensor for obtaining predetermined information is not limited. Also, the vehicle may include various communication devices for receiving information from the outside of the vehicle, and transmitting information to the outside of the vehicle. For example, the vehicle may obtain location information of the vehicle via a device such as a navigation. Also, the vehicle may transmit and receive data to/from a neighboring vehicle via an inter-vehicle communication device.

Hereinafter, descriptions will be provided from the perspective of a vehicle including an anti-collision control device, and the vehicle including the anti-collision control device is referred to as a "vehicle" or a "user vehicle". Also, the vehicle, hereinafter, may include an autonomous vehicle for which vehicle movement control by a driver is minimized.

Figure 1:
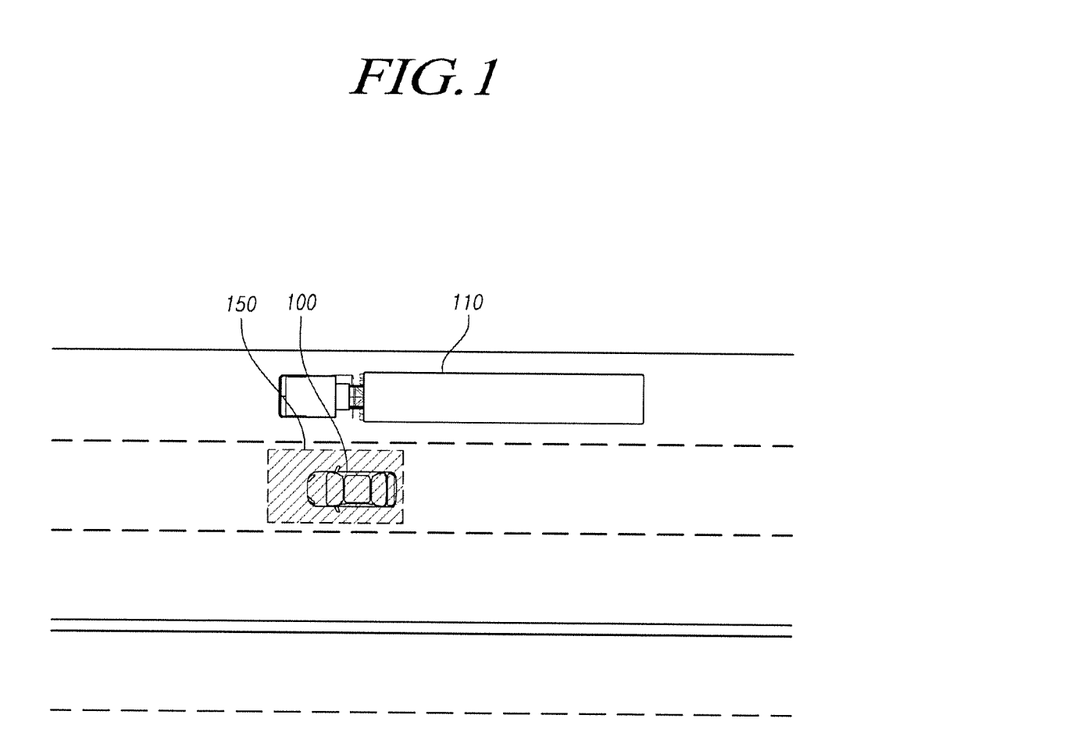
FIG. 1 is a diagram illustrating a situation in which a risk of collision with a neighboring vehicle increases when a user vehicle is located in the blind spot of the neighboring vehicle.

FIG. 1 is a diagram illustrating a situation in which a risk of collision with a neighboring vehicle increases when a user vehicle is located in the blind spot of the neighboring vehicle.

Referring to FIG. 1, a neighboring vehicle 110 may drive in a lane next to a lane in which a vehicle 100 drives. For example, the neighboring vehicle 110 may be a large vehicle such as a bus or a truck, or may be a small vehicle.

A blind spot 150 may be generated in a predetermined area due to the structure of the neighboring vehicle 110 and a limitation of a driver's view. For example, in the case of a truck, of which the height is high and in which the driver's seat is located up high, a predetermined area including a lateral side immediately next to the driver's seat may become the blind spot 150 which may not be detected by a side mirror or the like. The range of the blind spot 150 of a large vehicle is wide, and the risk of accident attributable to the blind spot 150 may be high.

In the present specification, the blind spot 150 may indicate an area or an angle at which a driver in a vehicle is incapable of identifying a neighboring vehicle, a lane, or an obstacle, due to an obstructive factor. For example, a predetermined area may exist that a driver is incapable of identifying via a side mirror, due to the structure of a vehicle, the view angle of the driver, and a traffic condition. The area will be referred to as a blind spot in the descriptions. Therefore, a blind spot may be generated in various sizes, shapes, and locations, depending on the model of a vehicle, driving habits of a driver, and road type.

A blind spot detector (BSD) may sense a rear lateral side of a vehicle using a radar sensor so as to sense the blind spot 150. However, a vehicle in which the BSD is not installed may not be able to sense a risk of a blind spot. Also, although the user vehicle 100 is equipped with a blind spot detector, the vehicle 100 may not identify whether the neighboring vehicle 110 is equipped with a blind spot detector, and thus, there still exists a risk of collision attributable to a change of a path made by the neighboring vehicle 110.

Therefore, embodiments described hereinafter provide a method and apparatus for avoiding a risk of collision in advance, which is caused by the neighboring vehicle 110, via an anti-collision control device of the user vehicle 100, irrespective of whether the neighboring vehicle 110 is equipped with the blind spot detector.

Figure 2:
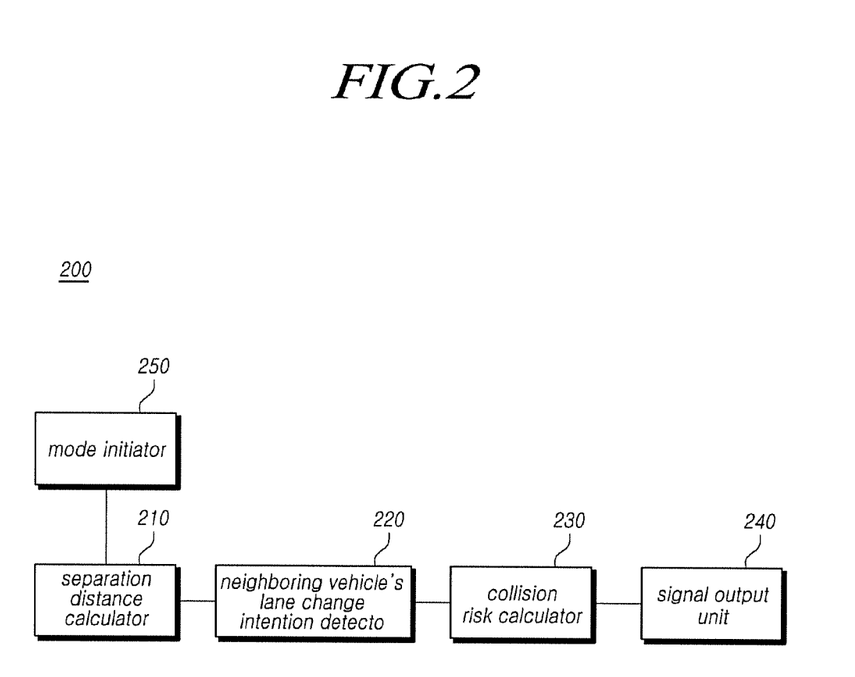
FIG. 2 is a diagram illustrating the configuration of an anti-collision control device according to an embodiment.

FIG. 2 is a diagram illustrating the configuration of an anti-collision control device according to an embodiment.]

Referring to FIG. 2, an anti-collision control device 200 according to an embodiment may include: a separation distance calculator 210 configured to calculate a horizontal separation distance between a vehicle and a neighboring vehicle which drives in a lane next to a lane in which the vehicle drives; a neighboring vehicle's lane change intention detector 220 configured to detect an intention to change lanes of the neighboring vehicle based on the separation distance information; a collision risk calculator 230 configured to calculate a risk of collision of the vehicle based on at least one from among information associated with the intention to change lanes of the neighboring vehicle, location information of the neighboring vehicle, location information of the vehicle, and relative speed information of the vehicle and the neighboring vehicle; and a signal output unit 240 configured to output a movement control signal or a warning control signal for the vehicle based on a result of calculating the risk of collision of the vehicle.

For example, when an initiation signal of an anti-collision control mode is input, the separation distance calculator 210 may determine whether a neighboring vehicle exists in the left lane or the right lane from the lane in which the vehicle drives, and may perform monitoring by calculating a separation distance between the vehicle and the neighboring vehicle when the neighboring vehicle exists. The separation distance calculator 210 may determine whether a neighboring vehicle exists in the left lane or the right lane from the lane in which the vehicle drives, based on sensing information received from a sensor installed in the vehicle. For example, the separation distance calculator 210 may determine whether a neighboring vehicle exists via a radar sensor or a camera sensor. As another example, the separation distance calculator 210 may determine whether a neighboring vehicle exists based on information received from the neighboring vehicle via a communication device included in the vehicle.

Also, the separation distance calculator 210 may receive sensing information from one or more distance measuring sensors included in a lateral side of the vehicle, and may calculate a horizontal separation distance between the vehicle and the neighboring vehicle using the received sensing information. For example, the distance measuring sensor may include at least one from among a ultrasonic sensor, a radar sensor, a lidar sensor, and a camera sensor. The separation distance calculator 210 may perform monitoring by calculating a separation distance at predetermined time intervals or at predetermined sampling intervals.

The neighboring vehicle's lane change intention detector 220 may detect an intention to change lanes of the neighboring vehicle using the calculated horizontal separation distance. For example, the neighboring vehicle's lane change intention detector 220 may determine that the neighboring vehicle intends to change lanes when the horizontal separation distance is calculated to be less than or equal to a predetermined reference warning distance. This indicates that the neighboring vehicle's approach into a lane in which the vehicle drives is detected. As another example, in order to prevent erroneous detection based on a temporary movement of the neighboring vehicle, the neighboring vehicle's lane change intention detector 220 may determine that the neighboring vehicle intends to change lanes when a situation in which a horizontal separation distance is calculated to be less than or equal to a predetermined reference warning distance is maintained at least for a predetermined period of time. As another example, the neighboring vehicle's lane change intention detector 220 may determine that the neighboring vehicle intends to change lanes when a horizontal separation distance with the neighboring vehicle is continuously decreased during a predetermined period of time.

Alternatively, the neighboring vehicle's lane change intention detector 220 may determine whether the neighboring vehicle intends to change lanes further using lighting information of a blinker of the neighboring vehicle which is sensed by a camera sensor. For example, when the neighboring vehicle turns on a blinker so as to enter a lane in which the vehicle drives, the neighboring vehicle's lane change intention detector 220 may determine that the neighboring vehicle intends to change lanes. The information associated with whether the neighboring vehicle turns on a blinker may be determined based on an image or image information obtained via a camera sensor installed in the vehicle.

Alternatively, the neighboring vehicle's lane change intention detector 220 may determine whether the neighboring vehicle intends to change lanes by taking into consideration a horizontal separation distance and information associated with whether a blinker of the neighboring vehicle is turned on. For example, the neighboring vehicle's lane change intention detector 220 may monitor a horizontal separation distance of a neighboring vehicle, and may determine that the neighboring vehicle intends to change lanes when a blinker in the direction of the vehicle is turned on although the horizontal separation distance is not within the above-described reference warning distance. That is, the neighboring vehicle's lane change intention detector 220 may determine whether the neighboring vehicle intends to change lanes by monitoring both a horizontal separation distance and whether a blinker of a neighboring vehicle is turned on, and giving priority to the information associated with whether a blinker is turned on.

Through the above, the probability that the neighboring vehicle will change lanes voluntarily or involuntarily may be determined and may be used for determining a risk of collision.

The collision risk calculator 230 may calculate a risk of collision between the vehicle and a neighboring vehicle based on at least one from among neighboring vehicle's lane change intention information, location information of the neighboring vehicle, location information of the vehicle, and vehicle speed information of the vehicle and the neighboring vehicle.

For example, when it is determined that a neighboring vehicle intends to change lanes to a lane in which the vehicle drives, and an area exists that overlaps the vehicle when the neighboring vehicle enters the lane in which the vehicle drives, the collision risk calculator 230 may determine that a risk of collision between the neighboring vehicle and the vehicle exist.

As another example, by further taking into consideration the vehicle speed of the vehicle and the vehicle speed of the neighboring vehicle, the collision risk calculator 230 may determine whether a risk of collision with the vehicle exists when the neighboring vehicle enters, at the current speed, a lane in which the vehicle drives at the current speed.

The signal output unit 240 may output a warning control signal for informing the vehicle or a neighboring vehicle of a risk of collision when it is determined that a risk of collision exists, which is attributable to a lane change by the neighboring vehicle. For example, the signal output unit 240 may output a warning control signal so that a warning signal is generated via a display device or a sound device of the vehicle. For example, the signal output unit 240 may perform a control such that an indication informing of a risk of collision attributable to an entry by the neighboring vehicle is output to a display device of the vehicle. As another example, the signal output unit 240 may perform a control such that a notification sound is output via an internal warning sound generating device of the vehicle. As another example, the signal output unit 240 may perform a control such that a warning sound is generated via an external sound device (e.g., vehicle's horn) of the vehicle. As another example, the signal output unit 240 may perform a control such that collision warning information including at least one from among information associated with the existence of the vehicle and collision risk information, to the neighboring vehicle via an inter-vehicle communication device.

As described above, the signal output unit 240 may report collision risk information to a driver of the vehicle, whereby the driver can handle the situation and may transmit the corresponding information to a neighboring vehicle so as to remove a cause of the risk of collision. Accordingly, safety may be secured.

Alternatively, the signal output unit 240 may output a warning control signal and may calculate a collision-free path for the vehicle to avoid a collision, in parallel, and may output a movement control signal for controlling a steering and vehicle speed control device of the vehicle such that the vehicle moves along the corresponding collision-free path. Alternatively, when the signal output unit 240 continuously detects the neighboring vehicle's intention to change lanes after outputting a warning control signal, and the neighboring vehicle's intention to change lanes is maintained a predetermined period of time after outputting the warning control signal, the signal output unit 240 may output a movement control signal so as to control the vehicle to move to a collision-free space to avoid a collision.

Alternatively, when two or more distance measuring sensors are installed in a lateral side of the vehicle, the signal output unit 240 may compare separation distance information calculated by each distance measuring sensor, and may calculate a collision-free path for the vehicle based on location information of a distance measuring sensor that first approaches within a reference warning distance. For example, in the case in which two distance measuring sensors included in one lateral side of the vehicle are located in the head and the back of the vehicle, when separation distance information calculated from a distance measuring sensor included in a front lateral side of the vehicle is less than or equal to the reference warning distance, a collision-free space for the vehicle may be set behind the vehicle and a speed reduction control may be performed, whereby a collision is avoided. Unlike the above, when separation distance information calculated from a distance measuring sensor included in a rear lateral side of the vehicle is less than or equal to the reference warning distance, a collision-free space for the vehicle may be set ahead of the vehicle and a speed acceleration control may be performed, whereby a collision is avoided. That is, based on the location of a neighboring vehicle that approaches the lane in which the vehicle drives, a movement control signal for the vehicle may be set differently and may be output.

The anti-collision control device 200 may further include a mode initiator 250 configured to perform a control so as to initiate the operation of an anti-collision control mode when the vehicle exists in the blind spot of a neighboring vehicle.

For example, the anti-collision control device 200 may further include the mode initiator 250 configured to perform a control so as to initiate the operation of the anti-collision control mode when the vehicle exists in the blind spot of a neighboring vehicle.

The mode initiator 250 may determine whether the vehicle is located in the blind spot of a neighboring vehicle using at least one piece of information from among location information of the vehicle, location information of the neighboring vehicle, height information of the neighboring vehicle, length information of the neighboring vehicle, and model information of the neighboring vehicle. The above-described information used for calculating the blind spot of the neighboring vehicle may be obtained using sensing information obtained by a camera sensor, an ultrasonic sensor, a radar sensor, a lidar sensor, an inter-vehicle communication device, and the like, and an information obtaining method may not be limited.

For example, the mode initiator 250 may identify blind spot size information stored in association with at least one of height information, length information, and car model information of a neighboring vehicle. That is, the mode initiator 250 may calculate a blind spot size corresponding to a sensed neighboring vehicle based on blind spot size information for each car model, blind spot size information for each height, or blind spot size information for each length, which is stored in advance. Subsequently, the mode initiator 250 may set the blind spot of the neighboring vehicle based on the neighboring vehicle by using location information and blind spot size information of the neighboring vehicle, and may determine whether the vehicle is located in the blind spot of the neighboring vehicle, using the location information of the vehicle.

As another example, when a neighboring vehicle enters a blind spot detection area of the vehicle, the mode initiator 250 may determine to initiate operation of an anti-collision control mode. For example, the neighboring vehicle approaches the vehicle from behind the vehicle, and the vehicle may become located in the blind spot of the neighboring vehicle. In this instance, since the neighboring vehicle may be detected in the blind spot detection area of the vehicle, when the neighboring vehicle is detected in the blind spot detection area, the mode initiator 250 may perform a control so as to initiate operation of the anti-collision control mode. That is, whether the neighboring vehicle approaches the vehicle may be determined using a blind spot detector.

Hereinafter, each configured operation of the above-described anti-collision control device 200 will be described in detail with reference to drawings.

Figure 3:
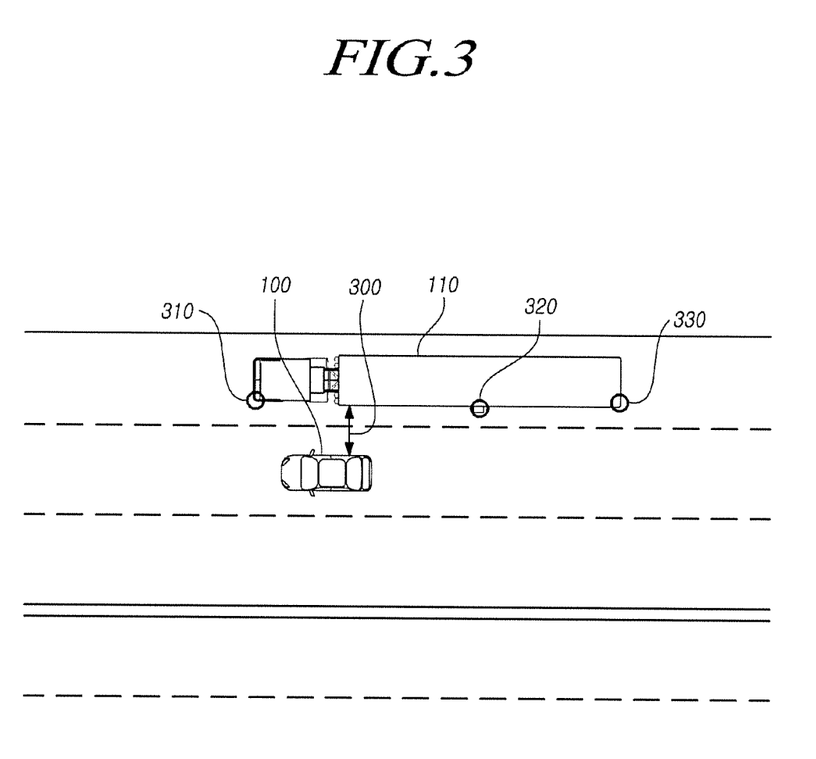
FIG. 3 is a diagram illustrating an example of detecting a neighboring vehicle's intention to change lanes according to an embodiment.

FIG. 3 is a diagram illustrating an example of detecting a neighboring vehicle's intention to change lanes according to an embodiment.

Referring to FIG. 3, the neighboring vehicle's lane change intention detector 220 may calculate a horizontal separation distance 300 between the vehicle 100 and the neighboring vehicle 110 via an ultrasonic sensor or a radar sensor. The anti-collision control device 200 may determine whether the horizontal separation distance 300 is less than or equal to a predetermined reference warning distance, and may determine whether the neighboring vehicle 110 intends to change lanes to the lane in which the vehicle 100 drives.

Alternatively, the neighboring vehicle's lane change intention detector 220 may identify whether blinkers 310, 320, and 330 installed in the neighboring vehicle 110 are turned on via a camera sensor, so as to determine whether the neighboring vehicle 110 intends to change lanes to the lane in which the vehicle 100 drives.

Alternatively, the neighboring vehicle's lane change intention detector 220 may determine whether the neighboring vehicle 110 intends to change lanes by taking into consideration both the horizontal separation distance information between the neighboring vehicle 110 and the vehicle 100 and information associated with whether the blinkers 310, 320, and 330 are turned on via a camera sensor. In this instance, whether the blinkers 310, 320, and 330 are turned on may be applied as a preemptive factor for determining the neighboring vehicle 110's intention to change lanes.

Figure 4:
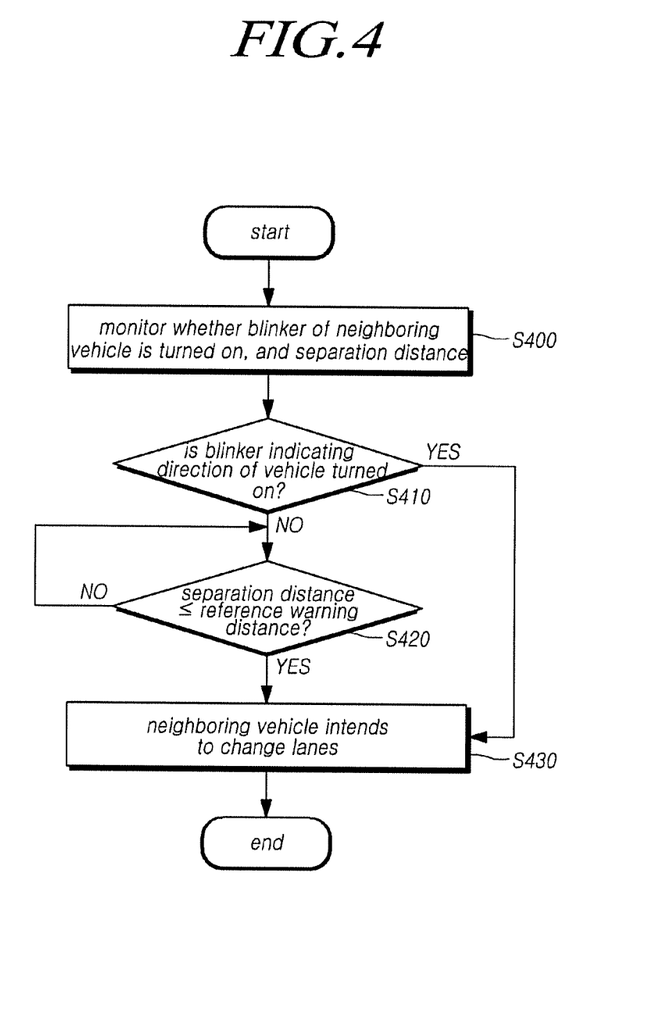
FIG. 4 is a flowchart illustrating another example of detecting a neighboring vehicle's intention to change lanes according to an embodiment.

FIG. 4 is a flowchart illustrating another example of detecting a neighboring vehicle's intention to change lanes according to an embodiment.

Referring to FIG. 4, the neighboring vehicle's lane change intention detector 220 may obtain information by monitoring whether a blinker of a neighboring vehicle is turned on and a horizontal separation distance in operation S400. Whether the blinker of the neighboring vehicle is turned on and the horizontal separation distance may be monitored by the above-described separation distance calculator 210.

The neighboring vehicle's lane change intention detector 220 may determine whether a blinker in the direction of the user vehicle is turned on in operation S410. As described above, whether a blinker is turned on may be extracted by analyzing an image or image information obtained via a camera sensor. When the blinker of the neighboring vehicle, which indicates the direction of the user vehicle, is turned on, the neighboring vehicle's lane change intention detector 220 may determine that the neighboring vehicle intends to change lanes in operation S430.

However, there is the possibility that the neighboring vehicle will change lanes without turning on a blinker, and thus, the neighboring vehicle's lane change intention detector 220 may determine whether a horizontal separation distance between the vehicle and the neighboring vehicle is calculated to be less than or equal to a predetermined reference warning distance even though the blinker of the neighboring vehicle is not turned on, in operation S420.

When the horizontal separation distance is calculated to be less than or equal to a reference warning distance, the neighboring vehicle's lane change intention detector 220 may determine that the neighboring vehicle intends to change lanes in operation S430. Alternatively, as described above, the neighboring vehicle's lane change indication detector 220 may determine whether the horizontal separation distance is calculated to be less than or equal to the reference warning distance, and may further determine whether the horizontal separation distance calculated less than or equal to the reference warning distance is maintained at least a predetermined period of time, so as to determine whether the neighboring vehicle intends to change lanes. Through the above, the probability that erroneous determination will be made based on a temporary change in a horizontal separation distance may be reduced.

Alternatively, the neighboring vehicle's lane change intention detector 220 may determine whether the neighboring vehicle intends to change lanes using only a horizontal separation distance, without monitoring whether a blinker is turned on, according to a setting.

The neighboring vehicle's lane change intention detector 220 may not obtain whether a blinker of the neighboring vehicle is turned on via a camera sensor, but may directly obtain information from the neighboring vehicle via inter-vehicle communication.

Through the above, the neighboring vehicle's lane change intention detector 220 may avoid a collision by determining, in advance, whether the neighboring vehicle changes lanes and moves in the direction of the user vehicle.

When it is detected that the neighboring vehicle intends to change lanes, the anti-collision control device 200 may output a warning control signal for reporting the neighboring vehicle's intention to a driver or the neighboring vehicle. Alternatively, the anti-collision control device 200 may calculate a risk of collision based on the intention to change lanes of the neighboring vehicle, location information of the neighboring vehicle, and vehicle speed information, and may output a warning control signal reporting the risk to a driver or the neighboring vehicle when the risk of collision between the neighboring vehicle and the vehicle exists.

Hereinafter, descriptions will be provided based on an example of the operation of the anti-collision control device 200 when a risk of collision with a neighboring vehicle is detected. However, the present embodiment may be equally applied when a warning control signal is output in the case in which only an intention to change lanes of the neighboring vehicle is identified.

Figure 5:
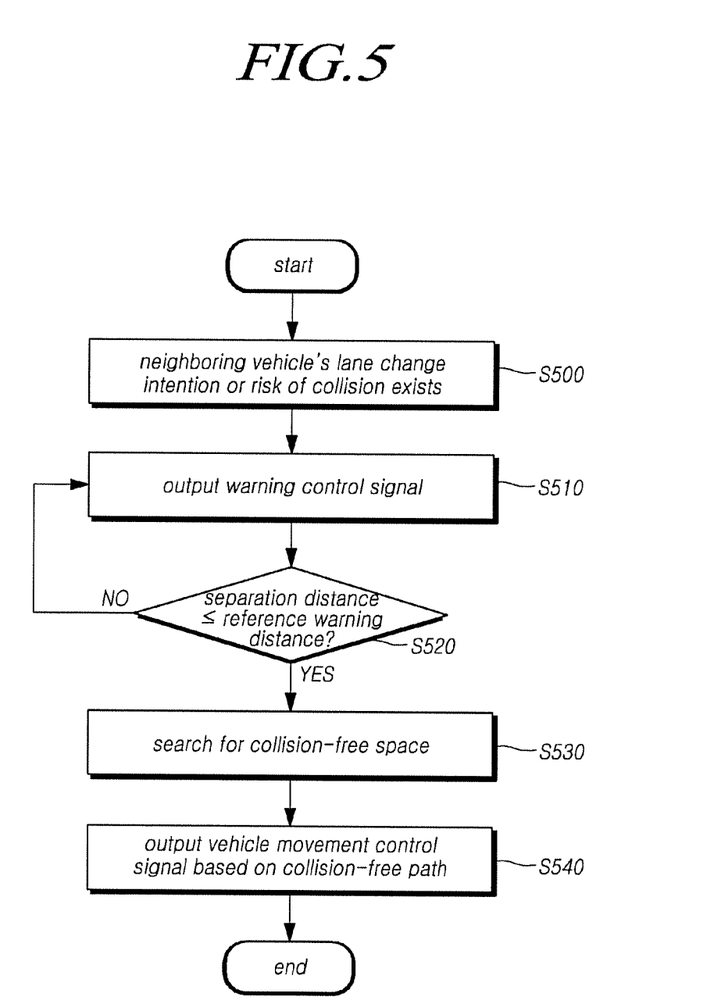
FIG. 5 is a flowchart illustrating an operation of avoiding a collision according to an embodiment.

FIG. 5 is a flowchart illustrating an operation for avoiding a collision according to an embodiment.

Referring to FIG. 5, when the anti-collision control device 200 receives a result of determining whether a risk of collision or a neighboring vehicle's intention to change lanes exists in operation S500, the anti-collision control device 200 outputs a warning control signal based on the determined result in operation S510.

For example, the warning control signal indicates a signal for controlling devices installed inside and outside the vehicle in order to report a risk of collision to a driver of the vehicle via the sense of sight, the sense of hearing, or the sense of touch. For example, the signal output unit 240 may perform a control such that information indicating a warning situation is displayed to a driver via a navigation or a human machine interface (HMI) device installed in the vehicle. As another example, the signal output unit 240 may perform a control such that a warning sound is generated via a sound device installed in the vehicle. As another example, the signal output unit 240 may output a vibration signal to a steering wheel of the vehicle, a driver's seat, or the like, so as to inform a driver of a risk of collision. In addition, the signal output unit 240 may perform a control to control the lighting in the vehicle so as to inform of a risk, and types of warning control signals and methods for providing a warning control signal may be variously set.

Even when the anti-collision control device 200 outputs a warning control signal, the anti-collision control device 200 may determine whether a horizontal separation distance between the vehicle and the neighboring vehicle is continuously decreased and a horizontal separation distance less than or equal to a predetermined reference collision-free distance is detected in operation S520.

For example, the horizontal separation distance calculator 210 of the anti-collision control device 200 continuously monitors a horizontal separation distance, and the collision risk calculator 230 or the neighboring vehicle's lane change intention detector 220 may determine whether a horizontal separation distance less than or equal to the predetermined reference collision-free distance is detected. The reference collision-free distance may be set in advance to a value less than the above-described reference warning distance. As described above, the reference warning distance to output a warning control signal and the reference collision-free distance to control a vehicle to directly avoid a risk are separately configured, whereby frequent movement control for the vehicle may be avoided and a driver may have stability when driving the vehicle.

When the horizontal separation distance is calculated to be less than or equal to the reference collision-free distance, the anti-collision control device 200 may search for a collision-free space which will be used for the vehicle to avoid a collision in operation S530. For example, the anti-collision control device 200 may determine whether a collision-free space exists which the vehicle may enter, using a radar sensor, an ultrasonic sensor, and a camera sensor which are installed in the front side, the rear side, and the lateral side of the vehicle. One or more collision-free spaces may be calculated, and one of the plurality of collision-free spaces may be selected based on a predetermined criterion. For example, when a plurality of collision-free spaces are retrieved, priority may be given to a collision-free space that requires a minimum degree of lane change from the vehicle. This may prevent a secondary accident attributable to lane change. Alternatively, when a plurality of collision-free spaces are retrieved, priority may be given to a collision-free space that increases the vehicle speed of the vehicle. Alternatively, a collision-free space that requires a rapid speed reduction of the vehicle may have the lowest priority. Rapid speed reduction may cause a risk of loss of movement control of the vehicle.

As described above, the anti-collision control device 200 may calculate whether to change lanes to select a collision-free space, a degree of acceleration/reduction of vehicle speed, collision probability information associated with another vehicle other than the neighboring vehicle that changes lanes, and the like, and may search for a collision-free space based on the calculated information and the predetermined criterion.

When a collision-free space is completely retrieved, the anti-collision control device 200 may calculate a collision-free path for moving the vehicle to the collision-free space, and may control a steering and speed change device of the vehicle such that the vehicle moves along the collision-free path. For example, the signal output unit 240 may output a movement control signal for controlling the steering device and the speed change device.

As described above, the mode initiator 250 may perform a control to initiate an anti-collision control mode when the vehicle enters the blind spot of the neighboring vehicle. To this end, the mode initiator 250 may need to calculate the blind spot of the neighboring vehicle. For example, the mode initiator 250 may receive blind spot coordinate information of the neighboring vehicle via an inter-vehicle communication device, and may reflect the information. Alternatively, the mode initiator 250 may calculate the blind spot of the neighboring vehicle using only information sensed via a sensor of the user vehicle. Hereinafter, an embodiment in which the mode initiator 250 identifies the blind spot of a neighboring vehicle using a sensor of the user vehicle will be described with reference to the drawing.

Figure 6:
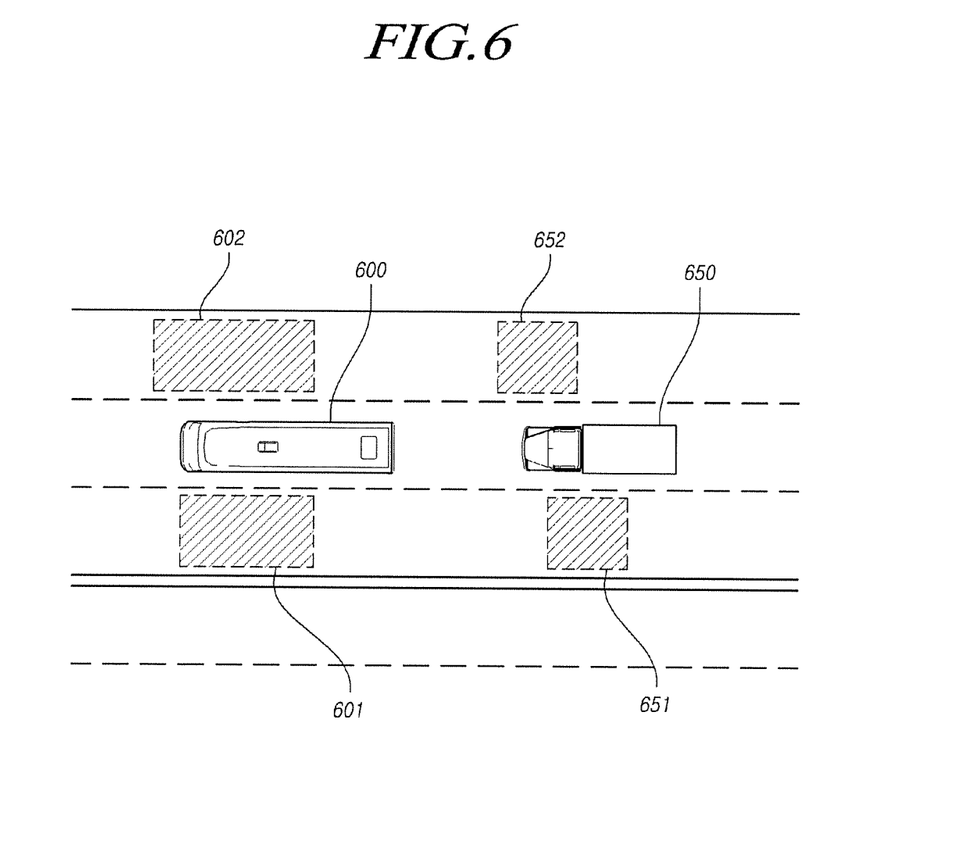
FIG. 6 is a diagram illustrating an operation of calculating the blind spot of a neighboring vehicle according to an embodiment.

FIG. 6 is a diagram illustrating an operation of calculating the blind spot of a neighboring vehicle according to an embodiment.

The mode initiator 250 may calculate the blind spot of a neighboring vehicle based on at least one piece of information from among height information of the neighboring vehicle, length information of the neighboring vehicle, location information of the neighboring vehicle, location information of the vehicle, and car model information of the neighboring vehicle.

Referring to FIG. 6, neighboring vehicles 600 and 650 may have different heights and different lengths, depending on a car model. For example, the bus 600 and the truck 650 may have different lengths and heights. Also, although neighboring vehicles are of a type which is the same as each other, such as the bus 600 or the truck 650, the neighboring vehicles may have different lengths and heights depending on the model and production year. For ease of description, FIG. 6 will provide descriptions from the perspective of a large special vehicle having a high height, but the embodiment may be equally applied to all vehicles including a normal car.

The mode initiator 250 may obtain blind spot size information using a blind spot size table including blind spot size information for each model. For example, the mode initiator 250 may identify the model of the neighboring vehicle 600 and 650 sensed via a sensor or a communication device installed in the vehicle, and may obtain blind spot size information of the identified model using the blind spot size table. The mode initiator 250 may calculate the blind spot of the neighboring vehicle currently on the road using the obtained blind spot size information and the location information of the neighboring vehicle.

The blind spot size table may include blind spot size information for each car model, and may include blind spot size information for each height and length of a neighboring vehicle. The blind spot size table may take two or more factors from among a car model, a height, and a length, and may store a blind spot size for each case in a mapping relationship. The blind spot size table may be set in advance via experiments and may be stored in the vehicle.

When it is assumed that the bus 600 of FIG. 6 is a neighboring vehicle, the mode initiator 250 may obtain length or height information of the bus 600 via a sensor installed in the vehicle. The mode initiator 250 may obtain the model of the bus 600 via image information of the bus 600 and the obtained length or height information. Alternatively, the mode initiator 250 may obtain at least one piece of information from among model information, length information, and height information of the bus 600 via inter-vehicle communication performed with the bus 600. Subsequently, the mode initiator 250 may obtain blind spot size information 601 and 602 of the bus 600 using at least one piece of the obtained model information, length information, and height information of the bus 600 and the previously set blind spot size table. Also, the left blind spot 601 and the right blind spot 602 of the bus 600 may be different in size and location, and the mode initiator 250 may calculate a corresponding blind spot 601 and 602 based on the location of the user vehicle. The size or location of the left blind spot 601 and the right blind spot 602 may be different based on the location of a driver.

In the same manner, in the case of the truck 650, the mode initiator 250 may calculate a blind spot size using at least one piece of the height information, length information, and model information of the truck 650, and the previously stored blind spot size table. Also, the mode initiator 250 may set a left blind spot 651 and a right blind spot 652 of the truck 650, which are calculated based on the location information of the truck.

The mode initiator 250 may calculate the above-described blind spots 601, 602, 651, and 652 before the user vehicle comes close to the bus 600 or the truck 650. Also, the mode initiator 250 may set a predetermined blind spot area (e.g., the blind spot 601, 602, 651, and 652) based on whether the user vehicle drives in a lane on the left or on the right of a lane in which the bus 600 or the truck 650 drives.

As described above, the mode initiator 250 may set a reference blind spot (e.g., the blind spot 601, 602, 651, and 652) of the neighboring vehicle 600 and 650 using at least one piece of the length information, height information, and car model information of the neighboring vehicle 600 and 650, and when the user vehicle enters the corresponding blind spot (e.g., the blind spot 601, 602, 651, and 652), the mode initiator 250 may initiate an anti-collision control mode.

Figure 7:
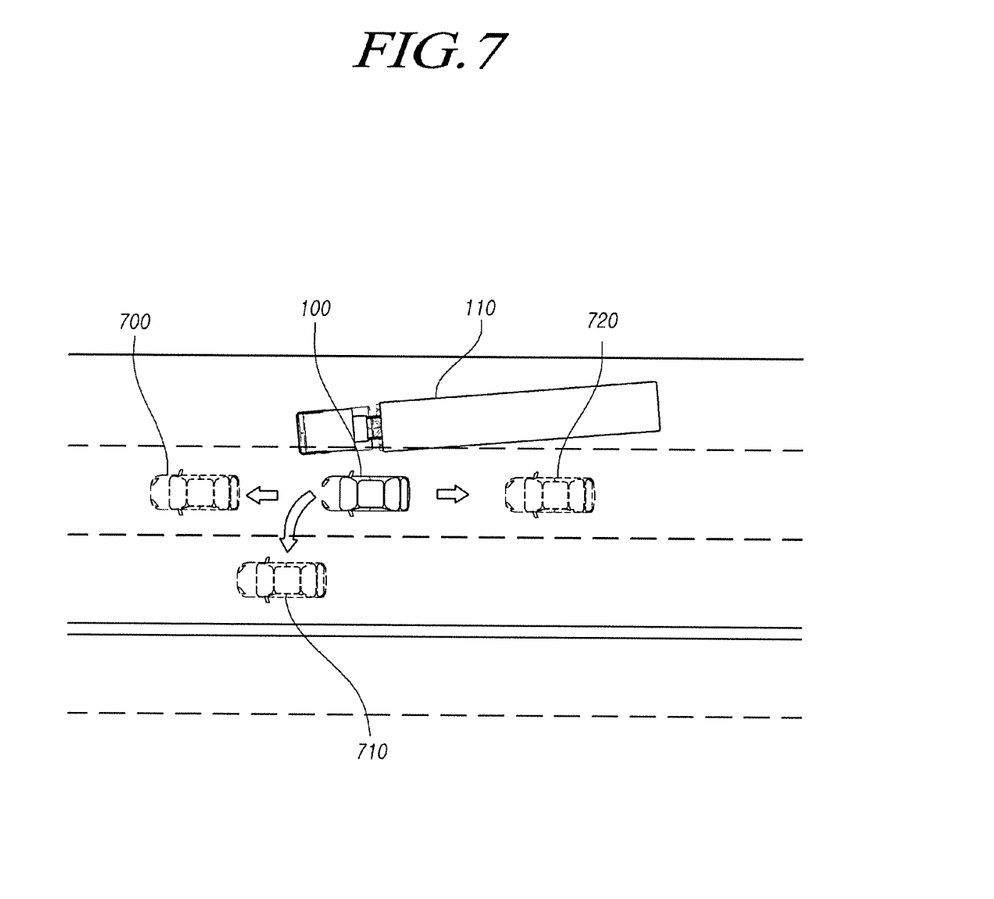
FIG. 7 is a diagram illustrating an operation of avoiding a collision by controlling the movement of a vehicle when a risk of collision exists according to an embodiment.

FIG. 7 is a diagram illustrating an operation of avoiding a collision by controlling a movement of a vehicle when a collision risk exists according to an embodiment.

Referring to FIG. 7, when a neighboring vehicle 110 changes lanes to a lane in which the vehicle 100 drives, the anti-collision control device 200 may detect that the neighboring vehicle 110 changes lanes, based on a horizontal separation distance or information associated with whether a blinker is turned on, and may calculate a risk of collision. As described in FIG. 7, when a risk of collision between the vehicle 100 and the neighboring vehicle 110 exists, the signal output unit 240 may output a movement control signal for controlling a movement of the vehicle.

As described above, the signal output unit 240 may calculate a collision-free space 700, 710, and 720 for avoiding a collision, and may calculate a collision-free path so that the vehicle 100 moves to the corresponding collision-free space 700, 710, and 720. Subsequently, the signal output unit 240 may output a signal for controlling a steering and speed change device of the vehicle so that the vehicle 100 moves to the selected collision-free space 700, 710, and 720.

The collision-free space may be calculated based on sensing information which is obtained via a plurality of sensors installed inside or outside the vehicle 100. For example, when a neighboring vehicle does not exist within a predetermined range in front of the vehicle 100, the front collision-free space 700 may be calculated. Also, when a neighboring vehicle does not exist within a predetermined range behind the vehicle 100, the rear collision-free space 720 may be calculated. In the same manner, when a neighboring vehicle does not exist in a lateral side of the vehicle 100, the lateral collision-free space 710 may be calculated.

As described above, the signal output unit 240 may select one of the plurality of calculated collision-free spaces 700, 710, and 720, and may calculate a collision-free path so that the vehicle 100 moves to the selected collision-free space.

The collision-free space may be selected based on information, such as whether the vehicle 100 needs to change lanes to move to the collision-free space, a degree of increase and decrease in speed, the probability of a collision with another vehicle other than the neighboring vehicle 110 that changes lanes, and the like.

For example, when a condition for minimizing the number of times that a lane change is performed is set in advance, the signal output unit 240 may select the front collision-free space 700 or the rear collision-free space 720. Also, the signal output unit 240 may select a collision-free space that has the smallest probability of a collision with a neighboring vehicle from among the front collision-free space 700 and the rear collision-free space 720. Alternatively, the signal output unit 240 may preferentially select the front collision-free space 700 since the movement controllability of the vehicle 100 may deteriorate when the vehicle 100 rapidly decreases speed.

When a neighboring vehicle exists in the front collision-free space 700 and the rear collision-free space 720, and the probability of a collision is high, the lateral collision-free space 710 is selected, and the vehicle is controlled to move to the selected lateral collision-free space 710.

Priority information for selecting a collision-free space may be set in advance.

According to the above-described embodiment, a separation distance between a user vehicle and a neighboring vehicle is monitored when the neighboring vehicle is located in a predetermined area, so that a risk of collision with the neighboring vehicle is sensed in advance and a warning is given, whereby the safety of a driver may be increased. Also, according to an embodiment, the safety of a user vehicle may be secured using a control device of the user vehicle although a blind spot detector is not installed in a neighboring vehicle, and vehicle movement control for avoiding a collision may be performed although a driver does not perform vehicle movement control.

Hereinafter, an anti-collision control method that performs all or some of the above-described embodiments will be described with reference to a drawing.

Figure 8:
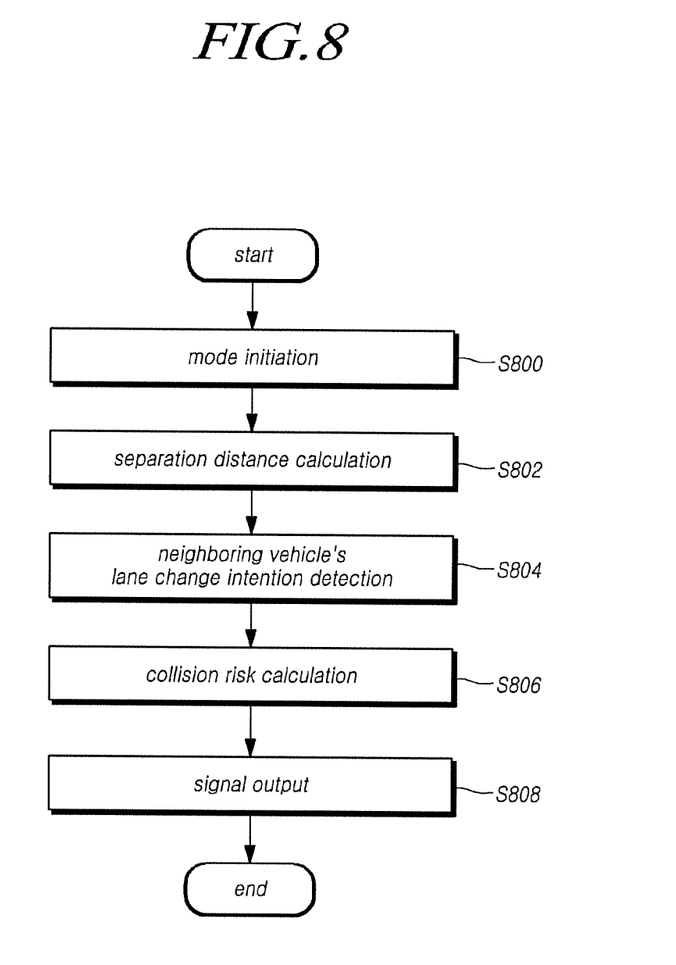
FIG. 8 is a flowchart illustrating an anti-collision control method according to an embodiment.

FIG. 8 is a diagram illustrating an anti-collision control method according to an embodiment.

Referring to FIG. 8, the anti-collision control method may include a separation distance calculation operation for calculating a horizontal separation distance between a vehicle and a neighboring vehicle which drives in a lane next to a lane in which the vehicle drives, in operation S802. The separation distance calculation operation performs monitoring by calculating the separation distance between the vehicle and the neighboring vehicle which drives in the lane next to the lane in which the vehicle drives. A sensor installed in the vehicle, such as an ultrasonic sensor, may be used to calculate the separation distance.

The anti-collision control method may include a neighboring vehicle's lane change intention detection operation for detecting a neighboring vehicles' lane change intention using separation distance information in operation S804. The neighboring vehicle's lane change detection operation may determine that the neighboring vehicle intends to change lanes when the horizontal separation distance between the vehicle and the neighboring vehicle is calculated to be less than or equal to a predetermined reference warning distance. Alternatively, the neighboring vehicle's lane change intention detection operation determines that the neighboring vehicles intends to change lanes when the horizontal separation distance is calculated to be less than or equal to a predetermined reference warning distance continuously during a predetermined period of time. Alternatively, the neighboring vehicle's lane change detection operation may determine that the neighboring vehicle intends to change lanes when the neighboring vehicle's blinker is turned on, which indicates the direction of the lane in which the vehicle drives, based on the lighting information of the neighboring vehicle's blinker. Alternatively, the neighboring vehicle's lane change detection operation may determine that the neighboring vehicle intends to change lanes by using both blinker lighting information of the neighboring vehicle and horizontal separation distance information, and giving priority to the blinker lighting information.

The anti-collision control method may include a collision risk calculation operation for calculating a risk of collision of the vehicle based on at least one piece of neighboring vehicle's lane change intention information, location information of the neighboring vehicle, location information of the vehicle, and relative speed information of the vehicle and the neighboring vehicle in operation S806. For example, when the neighboring vehicle intends to change lanes and the neighboring vehicle enters a lane in which the user vehicle drives, the collision risk determination operation may determine whether the probability of a collision with the user vehicle exists based on the vehicle speed of the neighboring vehicle, the vehicle speed of the user vehicle, and location information of the neighboring vehicle and the user vehicle. When the probability of a collision exists, it is determined that a risk of collision exists.

The anti-collision control method may include a signal output operation for outputting a movement control signal or a warning control signal for the vehicle, based on a result of calculating the risk of collision of the vehicle in operation S808. The signal output operation may perform a control such that a warning signal is generated to the user vehicle or the neighboring vehicle when the neighboring vehicle's intention to change lanes is detected. For example, the signal output operation may perform a control such that warning information is output via a display or a sound device of the user vehicle. Alternatively, the signal output operation may perform a control such that a warning signal is generated via a horn or a communication device of the user vehicle, whereby warning information is transmitted to the neighboring vehicle.

The signal output operation selects a collision-free space for the vehicle when the horizontal separation distance is less than or equal to a reference collision-free distance, and may output a signal for controlling movement of the vehicle such that the vehicle moves to the collision-free space. Alternatively, when the blinker of the neighboring vehicle is continuously on during a predetermined period of time or when the horizontal separation distance decreases during a predetermined period of time in the state in which the blinker is continuously on, the signal output operation may calculate a collision-free space and may output a signal for controlling the vehicle to move along a collision-free path.

Alternatively, when two or more distance measuring sensors are installed on a lateral side of the vehicle, the signal output operation may compare separation distance information calculated by each distance measuring sensor, and may calculate a collision-free path of the vehicle based on location information of a distance measuring sensor that first approaches within a reference warning distance. For example, in the case in which two distance measuring sensors installed on one lateral side of the vehicle are located in the head and the back of the vehicle, when separation distance information calculated from a distance measuring sensor installed in the front lateral side of the vehicle is less than or equal to the reference warning distance, a rear collision-free space for the vehicle may be set and speed reduction control may be performed, whereby a collision is avoided. Unlike the above, separation distance information calculated from a distance measuring sensor installed in the rear lateral side of the vehicle is less than or equal to the reference warning distance, a front collision-free space for the vehicle may be set and speed acceleration control may be performed, whereby a collision is avoided. That is, based on the location of the neighboring vehicle that approaches a lane in which the vehicle drives, a movement control signal for the vehicle may be set to be different and may be output.

As described above, a plurality of collision-free spaces may be calculated. A predetermined collision-free space may be selected based on priority information set in advance, together with the probability of a collision with another vehicle including the neighboring vehicle when the vehicle moves to a collision-free space, whether the vehicle changes lanes (or the number of times that the vehicle changes lanes), whether the vehicle needs to change a vehicle speed, or the like.

The anti-collision control method may further include a mode initiation operation for performing control so as to initiate the operation of an anti-collision control mode when the vehicle exists in the blind spot of the neighboring vehicle in operation S800.

Before the separation distance calculation operation, the anti-collision control method may further include a mode initiation operation for initiating the operation of an anti-collision control mode when the vehicle exists in the blind spot of the neighboring vehicle in operation 8800. The mode initiation operation may calculate a neighboring vehicle's reference blind spot using at least one piece of the model information, height information, length information, and location information of the neighboring vehicle, and may determine whether the vehicle enters the blind spot of the neighboring vehicle. To this end, the above-described blind spot size table may be used, and a plurality of sensors and devices which are installed in the vehicle, such as a camera sensor, an ultrasonic sensor, a radar sensor, a vehicle communication device, and the like, may be used.

When it is determined that the vehicle enters the blind spot of the neighboring vehicle, the mode initiation operation may initiate an anti-collision control mode, and may perform a control such that operations S802 to 808 are performed.

Alternatively, when the neighboring vehicle enters a blind spot detection area of the vehicle, the mode initiation operation may determine to initiate the operation of the anti-collision control mode. For example, the neighboring vehicle approaches the vehicle from behind the vehicle, and the vehicle may become located in the blind spot of the neighboring vehicle. In this instance, since the neighboring vehicle may be detected in the blind spot detection area of the vehicle, when the neighboring vehicle is detected in the blind spot detection area, the mode initiation operation may perform a control so as to initiate the operation of the anti-collision control mode. That is, whether the neighboring vehicle approaches the vehicle may be determined using a blind spot detector.

In addition, when the operations of the anti-collision control device which have been described with reference to FIGS. 1 to 7 are performed, the order of the operations may be changed or some of the operations may be omitted.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure. The above embodiments of the present disclosure have been described only for illustrative purposes, and those skilled in the art will appreciate that various modifications and changes may be made thereto without departing from the scope and spirit of the disclosure. The scope of the present disclosure shall be construed on the basis of the accompanying claims in such a manner that all of the technical ideas included within the scope equivalent to the claims belong to the present disclosure.

What is claimed is:

1. An anti-collision control device, comprising a processor configured to:
    calculate a horizontal separation distance between a vehicle and a neighboring vehicle which drives in a lane next to a lane in which the vehicle drives,
    detect an intention to change lanes of the neighboring vehicle, based on separation distance information,
    calculate a risk of collision of the vehicle based on at least one from among information associated with the intention to change lanes of the neighboring vehicle, location information of the neighboring vehicle, location information of the vehicle, and relative speed information of the vehicle and the neighboring vehicle,
    output a movement control signal or a warning control signal for the vehicle based on a result of calculating the risk of collision of the vehicle,
    upon determining that the risk of collision exists, calculate a collision-free path for avoiding the collision, and compare separation distance information calculated from each distance measuring sensor among two or more distance measuring sensors installed on one lateral side of the vehicle, and calculate the collision-free path based on location information of a distance measuring sensor which approaches within a reference warning distance first.

2. The anti-collision control device of claim 1, wherein the processor calculates the horizontal separation distance using sensing information from at least one distance measuring sensor installed in a lateral side of the vehicle.

3. The anti-collision control device of claim 1, wherein the processor determines that the neighboring vehicle intends to change lanes when the horizontal separation distance is calculated to be less than or equal to a predetermined reference warning distance.

4. The anti-collision control device of claim 3, wherein the processor determines that the neighboring vehicle intends to change lanes when a state in which the horizontal separation distance is calculated to be less than or equal to the predetermined reference warning distance is continued during a predetermined period of time.

5. The anti-collision control device of claim 1, wherein the processor determines whether the neighboring vehicle intends to change lanes by further using lighting information associated with a blinker of the neighboring vehicle, which is sensed by a camera sensor.

6. The anti-collision control device of claim 1, wherein, when it is determined that the neighboring vehicle intends to change lanes to the lane in which the vehicle drives, processor identifies the existence of an area that overlaps the location of the vehicle when the neighboring vehicles enters the lane, and determines the risk of collision.

7. The anti-collision control device of claim 1, wherein, when it is determined that the risk of collision exists, the processor outputs the warning control signal such that a warning signal is generated via a display device or a sound device of the vehicle, or outputs the warning control signal such that collision warning information is transmitted to the neighboring vehicle via an inter-vehicle communication device.

8. The anti-collision control device of claim 1, wherein, when it is determined that the risk of collision exists, the processor outputs the movement control signal for controlling steering and speed of the vehicle such that the vehicle moves along the collision-free path.

9. The anti-collision control device of claim 1, the processor is further configured to determine initiation of operation of an anti-collision control mode,
wherein the processor calculates the horizontal separation distance when the anti-collision control mode is initiated.

10. The anti-collision control device of claim 9, wherein the processor determines initiation of operation of the anti-collision control mode when the vehicle exists in a blind spot of the neighboring vehicle, and
the blind spot of the neighboring vehicle is calculated based on at least one from among height information of the neighboring vehicle, length information of the neighboring vehicle, location information of the neighboring vehicle, location information of the vehicle, and model information of the neighboring vehicle.

11. The anti-collision control device of claim 10, wherein the processor determines a blind spot size corresponding to the neighboring vehicle using a plurality of pieces of blind spot size information which are previously stored in accordance with at least one piece of information from among the height information of the neighboring vehicle, the length information of the neighboring vehicle, and the model information of the neighboring vehicle, and
the blind spot of the neighboring vehicle is calculated based on the blind spot size and the location information of the neighboring vehicle.

12. The anti-collision control device of claim 9, wherein the processor determines initiation of operation of the anti-collision control mode when the neighboring vehicle enters a blind spot detection area of the vehicle.

13. An anti-collision control method, comprising:
calculating a horizontal separation distance between a vehicle and a neighboring vehicle that drives in a lane next to a lane in which the vehicle drives;
detecting an intention to change lanes of the neighboring vehicle using separation distance information;
calculating a risk of collision of the vehicle based on at least one piece of information from among lane change intention information of the neighboring vehicle, location information of the neighboring vehicle, location information of the vehicle, and relative speed information of the vehicle and the neighboring vehicle;
outputting a movement control signal or a warning control signal for the vehicle based on a result of calculating the risk of collision of the vehicle; and
comparing distance information calculated by each distance measuring sensor among two or more distance measuring sensors installed on one lateral side of the vehicle, and calculating a collision-free path of the vehicle based on location information of a distance measuring sensor which approaches within a reference warning distance first.

14. The anti-collision control method of claim 13, wherein, before the calculating a horizontal separation distance, the method further comprises initiating operation of an anti-collision control mode when the vehicle exists in a blind spot of the neighboring vehicle.

* * * * *